Nov. 29, 1966  M. L. THOMPSON  3,288,961
HUMIDITY CONTROL WITH POSITIVE SWITCH ACTUATION MEANS
Filed June 4, 1965

INVENTOR.
MAYNARD L. THOMPSON
BY
ATTORNEY

United States Patent Office 3,288,961
Patented Nov. 29, 1966

3,288,961
HUMIDITY CONTROL WITH POSITIVE SWITCH
ACTUATION MEANS
Maynard L. Thompson, Bloomington, Minn., assignor to
Honeywell Inc., Minneapolis, Minn., a corporation of
Delaware
Filed June 4, 1965, Ser. No. 461,237
9 Claims. (Cl. 200—61.06)

The present invention is concerned with a moisture responsive control device; in particular, a device containing an element which changes in length as the moisture in the gas surrounding the element changes for operating a switch and having a rigid mechanical coupling between an adjusting member and for positively operating the switch independent of the element after the adjusting member is moved beyond a predetermined range.

In the control of residential humidification and dehumidification equipment, the normal control is accomplished with a device which is responsive to the moisture in the air of a space to turn on the humidification or de-humidification equipment for adding or removing moisture from air delivered to or contained in the space. Whether the control apparatus is controlling de-humidification or humidification equipment, the need for a means to either positively turn off the equipment or positively turn on the equipment very often exists. While there have been various arrangements for accomplishing positive operation independent of the sensing element, the present invention provides an improved means for accomplishing the positive operation; so that, under an extreme humidity level which might greatly affect the moisture responsive element, the control apparatus can still be positively operated through the control point adjustment mechanism.

The present invention provides an adjusting member and a switch operating member which are connected by a moisture responsive element which changes in length with moisture level. Connected between the adjusting member and the switch operating member is a mechanical connection which positively connects the adjusting member and the switch operating member when the adjusting member is in a predetermined range of adjustment in which positive operation of the switch is to be obtained. Specifically, the mechanical connection is a rigid length connected between two elongated openings on the adjustment member and the switch operating member so that during the normal movement of the adjusting member and switch operating member as the moisture responsive element changes in length with humidity changes, the mechanical length does not positively connect the adjusting member and the switch operating member.

Another embodiment of the present invention is in the addition of a lever means associated with the switch operating member which is adapted to be positioned by a water level responsive device or float to positively operate the switch when the water level reaches some predetermined value. When the control apparatus is used for either humidification or de-humidification control, the water level responsive mechanism is used to turn off the humidification apparatus when the water level in the supply tank becomes exhausted or to turn off the de-humidification apparatus when the water level in a collecting reservoir reaches some predetermined high level.

These and other embodiments of the present invention will become apparent upon a study of the following specification and claims of which—

Figure 1:
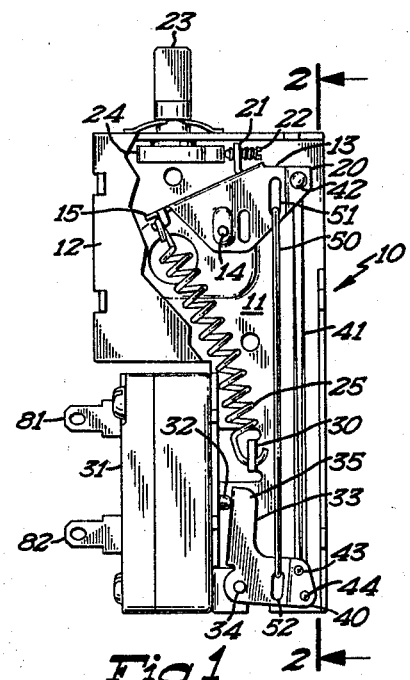
FIGURE 1 is a side view of the control apparatus showing the adjusting lever and switch operating lever connected by a moisture responsive element and the rigid mechanical length for the positive operation.
Figure 2:
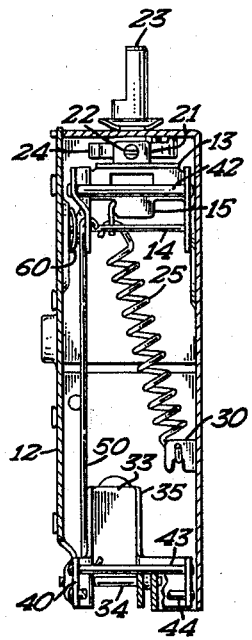
FIGURE 2 is a side view of the control apparatus of FIGURE 1 looking from the right to show the strain release spring associated with the adjusting lever.

Referring to FIGURE 1, a housing or base 10 has a back 11 and four sides and a cover 12. Pivotally supported in the upper end of the housing is an adjusting lever 13 which is pivoted on a pin or shaft 14 attached to extend perpendicular from the back 11. Lever 13 has a first extremity 15 projecting to the left and a second extremity 20 projecting to the right. A tab 21 attached to lever 13 extends upward and contains a calibration screw 22. A shaft 23 is rotatably supported in the upper end of base 10 and has a cam 24 attached to the lower extremity in the housing. Cam 24 cooperates with screw 22 to position lever 13 about pin 14 depending upon the control point selected by the position of shaft 23 to which a control point adjusting knob might be attached.

Lever 13 is biased in a counterclockwise direction by a spjring 25 connected between extremity 15 and a tab 30 projecting from back 11 near the lower end of the housing.

A switch 31 of the type shown in the McGall Patent 1,960,020 is mounted in the lower end of housing 12. Switch 31 has an operating member or button 32 which projects to the right. A switch operating lever 33 which is pivotally supported on a pin or shaft 34 extending perpendicular from back 11 has a first extremity 35 which engages member 32 and a second extremity 40. A moisture responsive element 41 which has a plurality of substantially parallel strands is connected between the extremity 20 of the adjusting member 13 and extremity 40 of the switch operating lever 33. Element 41 might be made of any particular type of material which changes in length as the moisture level changes such as a ribbon of nylon. To increase the amount of force available, element 41 is shown to have four substantially parallel lengths which are provided by stringing a continuous length of ribbon element over a support or pin 42 in extremity 20 and two supports or pins 43 and 44 in extremity 40; however, any particular type of moisture responsive element which changes in length might be used.

As shaft 23 is rotated to change the position of cam 24, lever 13 is moved to reposition extremity 20 whereby depending upon the length of element 41, lever 33 is repositioned to change the position of the switch operating member 32 and thus operate the switch. Spring 25 biases lever 13 in a counterclockwise direction so screw 22 engages cam 24, but the main purpose of spring 25 is to provide a strain release should the length of the element 41 decrease to a certain length beyond the limit of movement of lever 33 so lever 13 can move clockwise and lift screw 22 off of the cam 24 rather than place too great a strain on element 41.

Interconnecting adjusting lever and switch operating lever 33 is a mechanical connection or wire 50. Wire 50 is hooked at each end through an elongated opening 51 in extremity 20 and an elongated opening 52 and extremity 40. During the normal movement of lever 31 and the movement of lever 33 as the length of the moisture responsive element changes, the hook end of wires 50 are free to move up and down in the elongated openings 51 and 52. When the adjusting lever 13 is moved beyond a predetermined range by the rotation of cam 24 to a position in which positive operation of switch 31 is desired, the ends of wire 50 engage the lower end of opening 51 and the upper end of opening 52 to provide a positive mechanical connection between lever 13 and lever 33 to positively move lever 33 and switch operating member 31.

Figure 3:
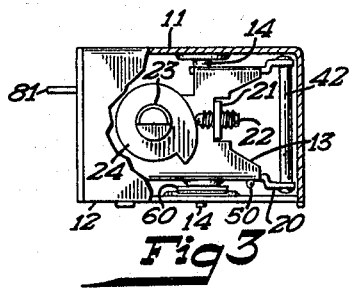
FIGURE 3 is a top view of the control device shown in FIGURES 1 and 2 with one particular cam confiuration which is moved by turning the shaft to adjust the position of the adjusting lever.

Referring to FIGURE 3, if cam 24 is turned clockwise to a position not engaging the left extremity of screw 22, lever 13 is biased counterclockwise as shown in FIGURE 1 by spring 25. Extremity 20 is pulled upward as shown in FIGURE 3 so wire 50 provides the positive connection between levers 13 and 33 as shown in FIGURE 1 to move operating member 32 inward to positively operate switch 31.

As cam 24 is rotated counterclockwise as shown in FIGURE 3, the cam surface rises with respect to screw 22, and as it engages screw 22, lever 13 is moved clockwise as shown in FIGURE 1. While the force is to the right on screw 22 as shown in FIGURE 3, a component of force would be downward to tend to move lever 13 against the front side 12 of the housing. To prevent lever 13 from moving against side 12, a leaf spring 60 is interposed between lever 13 and side 12 on pin 14 to overcome the component of force caused as the cam 24 is moved clockwise.

Figure 5:
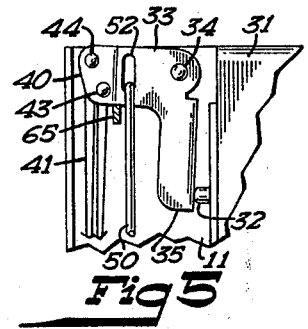
FIGURE 5 is a side view of FIGURE 4 looking from the right to show the specific manner in which the water level responsive means cooperates with the switch actuating lever to operate the switch.

Another embodiment of the present invention provides for the operation of the switch operating lever 33 in response to a water level responsive device 61. A tab 62 is bent out from the front side 12 of the housing to pivotally support a lever 63 on a pin 64. Lever 63 has a projection 65 extending inward under extremity 40 of switch operating lever 33. Connected to the other end 70 of lever 63 is a water level responsive device or float 71 which is adapted to respond to the level of water 72 in a tank 73 which might be associated with the humidifying or de-humidifying apparatus being controlled by the switch 31 of the apparatus of FIGURE 1. As the water level 72 drops in tank 73, lever 63 is pivoted clockwise to lift extremity 40 as shown in FIGURE 5 to move switch operating lever 33 in a manner to change the position of switch operating member 32 and positively operate switch 31.

*Operation*

When the control apparatus of FIGURE 1 is used to control humidification or de-humidification apparatus, the apparatus is connected electrically to terminals 81 and 82 of switch 31. The type of switch used is selected for the particular application; that is, one switch may open the circuit between terminals 81 and 82 when the operating member 32 is pushed inward and another switch may have the circuit between terminals 81 and 82 closed when the operating member is pushed inward. Depending upon the position of lever 13 as selected by the control point adjustment knob attached to shaft 23, the length of the moisture responsive element 41 will determine the position of lever 33 and thus the operation of switch 31. As the moisture in the space surrounding element 41 increases the length of element 41 would increase and for a given position of lever 13, lever 33 would move in a clockwise direction to allow member 32, which is spring biased outward by a resilient bias inside switch 31, to move outward. As the moisture level of the space surrounding element 41 decreases, the length of element 41 would decrease to cause a reverse operation of lever 33 to push member 32 inward to operate the switch in the opposite manner.

Within a given range of movement of shaft 23, cam 45 would reposition lever 13 to select various levels of humidity which would be maintained by the apparatus controlled by switch 31. During this particular range of operation, member 50 would be loosely attached to levers 13 and 33 so that the mechanical connection between the levers is not made.

When shaft 23 is rotated clockwise as shown in FIGURE 3 until this surface of cam 24 moves away from the extremity of screw 22, lever 13 would move counterclockwise as shown in FIGURE 1. Beyond the normal operating range of the position of lever 13, wire 50 would engage the ends of the elongated openings 51 and 52 to provide a mechanical connection between lever 13 and 33 to lift upward on lever 33 and positively move member 32 inward regardless of the length of element 41.

Figure 4:
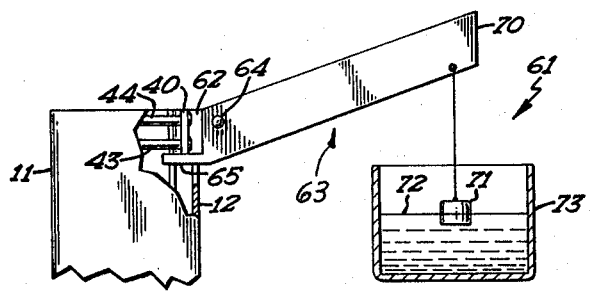
FIGURE 4 is another embodiment of the present invention showing the lever associated with the switch operating lever to positively operate the switch in response to a water level responsive means.

Under certain conditions wherein the humidity was quite high, the length of element 41 may be quite long and even though cam 24 was moved to a position as shown in FIGURE 3, without wire 50, the element would be so long that lever 13 would not positively lift extremity 40 of lever 33 to operate switch 31. In this range of operatioin, the mechanical connection accomplished by wire 50 rigidly connects levers 13 and 33 to positively operate the switch. In the second embodiment as shown in FIGURE 4, the water level responsive device 61 can positively control the operation of the switch. As the level of the water 72 drops in container 73, lever 63 is moved in a clockwise direction so that tab 65 lifts on extremity 40 of the switch operating lever 33 as shown in FIGURE 5 to positively move member 32 and operate the switch independent of the length of the moisture responsive element 41 or the mechanical connection accomplished by wire 50. Projection 65 would provide sufficient force on lever 33 to move lever 13 through either the element 41 or the wire 50 against the force of the bias spring 26 as shown in FIGURE 1.

Depending upon the type of switch used, the water level responsive apparatus can positively operate switch 31 when the switch is used to control either a humidity or de-humidification apparatus. In humidification apparatus when the level of water in the supply tank 73 reaches a low level the operation of humidification apparatus cannot properly exist and the water level control would positively operate switch 31 to turn off the humidification apparatus. In a de-humidification apparatus, the water level responsive apparatus 61 could be used to control switch 31 to positively turn off the de-humidification apparatus when the water in a collecting tank reaches some predetermined high level to prevent the tank from overflowing.

While the present invention has been described in one particular manner, the scope of the invention is intended only to be limited by the appended claims in which I claim:

1. In a humidity responsive device, a base, switch means mounted on said base, said switch means having an operating button which is spring biased outward, an adjusting lever, means pivotally mounting said lever at one end of said base, an adjusting member mounted in said base and connected to said adjusting lever for positioning said adjusting lever, a switch operating lever, means pivotally connecting said switch operating lever at another end of said base, said switch operating lever engaging said button, a moisture responsive element changing in length as the quantity of moisture in the surrounding air changes, means connecting said element between free ends of said adjusting lever and said switch operating lever, mechanical connection means, means loosely connecting said connection means between said adjusting lever and said switch operating lever in parallel with said element whereby upon a need for positive operation of said switch means independent of said element said adjusting member can be moved to one extreme position to operate said switch.

2. In a humidity responsive device, a base member, switch means mounted on said base member, said switch means having an operating member which is spring biased outward to require an inward force to operate said switch means, an adjusting lever means, means pivotally mounting said lever means at one end of said base member, switch operating lever means, means pivotally connecting said switch operating lever means at another end of said base member, said switch operating lever means engaging said operating member, moisture responsive means having a length which varies with moisture content, means connecting said responsive means between said adjusting lever means and said switch operating lever means, connection means connecting said adjusting lever means and said switch operating lever means, said connection means providing movement of said adjusting lever means in a first range to only move said switch operating lever means through said moisture responsive means and providing for movement of said adjusting lever means in a second range to positively move said switch operating lever independent of said moisture responsive element.

3. In a humidity responsive device, a base, switch means mounted on said base, said switch means having an operating member, said switch means being adapted to control humitdy conditioning apparatus, an adjusting lever, means pivotally mounting sair lever at one end of said base, a switch operating lever, means pivotally connecting said switch operating lever at another end of said base, said switch operating lever engaging said operating member, a moisture responsive element, means connecting said element said adjusting lever and said switch operating lever, and third lever means, means connecting said third lever means to said base whereby said third lever means engages said switch operating lever, said third lever means being adapted to respond to the level of water in a tank whereby upon said level reaching a predetermined value said third lever can operate said switch independent of said element.

4. In a humidity responsive device, a base, switch means mounted on said base, said switch means being adapted to control humidity conditioning apparatus, an adjusting lever, means pivotally mounting said lever at one end of said base, a switch operating lever, means pivotally connecting said switch operating lever at another end of said base, means connecting said switch operating lever to operate said switch, a moisture responsive element, means connecting said element between said adjusting lever and said switch operating lever, third lever means, means connecting said third lever means to said base whereby said third lever means engages said switch operating lever, said third lever means being adapted to respond to the level of water in a tank whereby upon said level reaching a predetermined value said third lever can operate said switch independent of said element, a rigid connection member, and means loosely connecting said connection member between said adjusting lever and said switch operating lever whereby upon a need for positive operation of said switch means independent of said moisture element said adjusting lever can be positioned to operate said switch means.

5. In a humidity control, a base member, an adjusting member, means rotatably mounting said adjusting member in one end of said base member, switch means having an operating member, means mounting said switch means to said base member, said switch means requiring an inward force on said operating member to operate said switch means, adjusting lever means, means connecting said lever means at one end of said base, spring means, means connecting said spring means between said adjusting lever and said base to bias said adjusting lever means toward said adjusting member, said lever means cooperating with said adjusting member so that first free extremity of said adjusting lever means can be positioned, switch operating lever means, means connecting said switch operating lever means at an opposite end of said base member, said switch lever means cooperating with said operating member and having a second free extremity so that when said free extremity is moved said switch is operated, a humidity responsive element, means connecting said element between said first and second extremities whereby upon a change in length of said element as the moisture level of the surrounding atmosphere changes said second lever is positioned to operate said switch means, a rigid connecting member, means loosely connecting said connecting member between said first and second extremities whereby upon the adjustment of said adjusting member in one direction to a predetermined position a positive connection exists between said adjusting lever means and said switch operating lever means to operate said switch independent of said element.

6. An improvement in a humidity control comprising, a base member, adjusting lever means mounted at one end of said base member, switch means mounted on said base member, switch actuating lever means mounted on said base member, said switch actuating lever means operating said switch when said actuating lever means is moved to one position, moisture responsive means having a length which changes with moisture content, means connecting said responsive means between said adjusting lever means and said actuating lever means whereby upon a change in the length of said responsive means as the moisture content changes said switch is operated at a moisture level selected by said adjusting lever means, the improvement comprising, a mechanical connection between said adjusting lever means and said switch actuating lever means to positively operate said switch means when said adjusting lever means is moved in one direction beyond a predetermined position.

7. In a control device for controlling a humidity control apparatus in response to the moisture level in the surrounding air and the level of water in a tank, a base member, switch means mounted in said base member, adjusting means mounted in said base, switch actuating means mounted in said base, means connecting said actuating means to said switch means, moisture responsive means connected between said adjusting means and said actuating means, said responsive means changing in length to operate said switch means, said switch means being adapted to control humidity control apparatus, lever means connected to said base and adapted to be controlled by a water level sensor, and means connecting said lever to operate said switch when the water level reaches a predetermined value.

8. In a humidity control, a base member, switch means having an operating member, means mounting said switch means to said base member, said switch means having an operating member requiring an inward force to operate said switch means, adjusting lever means, said adjusting lever means having an elongated opening, means connecting said lever means at one end of said base member, said lever means cooperating with said adjusting member so that a first free extremity of said adjusting lever means can be positioned, switch operating lever means, said operating lever means having a second elongated opening, means connecting said switch operating lever means at an opposite end of said base member, said switch lever means cooperating with said operating member and having a second free extremity so that when said free extremity is adjusted said switch is operated, a humidity responsive element, means connecting said element between said first and second free extremities whereby upon a change in length of said element as the moisture level of the surrounding atmosphere changes said second lever is positioned to operate said switch means, a rigid connecting member, means connecting said connecting member between said first and second free extremities by hooking the opposite ends of said connecting member in said elongated openings whereby upon the adjustment of said adjusting lever means in one direction a positive connection exists between said adjusting lever means and said switch operating lever means when said last mentioned means are a predetermined distance apart to move said operating member inward to operate said switch independent of said element.

9. In a control device, a base member, switch means mounted on said base member, adjusting lever means mounted on said base member, condition responsive means, said condition responsive means changing in length as a condition in the surrounding space changes, means connecting said condition responsive means between said adjusting lever means and said switch means to operate said switch means upon the condition reaching a predetermined value, connection means, means connecting said connection means between said adjusting lever means and said switch means to provide for positive operation of said switch means through said adjusting lever means after said adjusting lever means has moved beyond a predetermined range of normal adjustment.

References Cited by the Examiner

UNITED STATES PATENTS

| | | | |
|---|---|---|---|
| 3,110,161 | 11/1963 | Maleck | 200—84 X |
| 3,115,557 | 12/1963 | Kjellman | 200—61 |
| 3,163,729 | 12/1964 | Flagg | 200—61 X |

BERNARD A. GILHEANY, *Primary Examiner.*

R. N. ENVALL, JR., *Assistant Examiner.*